United States Patent [19]

Barneoud et al.

[11] 4,258,937
[45] Mar. 31, 1981

[54] CONNECTING DEVICE FOR AN EQUIPMENT UNIT SUSPENDED FROM A SYSTEM WHICH SUBJECTS SAID UNIT TO DIFFERENTIAL MOVEMENTS OF DISPLACEMENT

[75] Inventors: Edouard R. Barneoud, Marnes-la-Coquette; Michel Guer, Echirolles; Paul Lecouvreur, Fresnes; Jean Roumailhac, Versailles, all of France

[73] Assignee: Commissariat a l'Energie Atomique, Paris, France

[21] Appl. No.: 653,580

[22] Filed: Jan. 29, 1976

[30] Foreign Application Priority Data

Feb. 6, 1975 [FR] France .................. 75 03748

[51] Int. Cl.² .............................................. F16L 3/16
[52] U.S. Cl. ........................................ 285/61; 285/164; 285/226; 285/363; 248/611
[58] Field of Search ............... 285/61, 223, 49, 48, 285/233, 226, 159, 163, 363, 164, 165, 140; 248/8, 18, 54 R, 358 R, 9, 10; 403/226, 225; 267/141; 277/167.5; 241/100.5

[56] References Cited

U.S. PATENT DOCUMENTS

| 2,115,713 | 5/1938 | Haire ................................ 267/141.7 |
| 2,540,512 | 3/1952 | Crain ................................ 285/61 |
| 2,646,958 | 7/1953 | Coykendall ...................... 248/611 |
| 3,393,928 | 7/1968 | Dutcher ........................... 241/100.5 |

FOREIGN PATENT DOCUMENTS

| 1650032 | 1/1970 | Fed. Rep. of Germany ............ 285/48 |
| 2214805 | 9/1973 | Fed. Rep. of Germany ........... 285/363 |
| 409971 | 3/1945 | Italy ........................................ 285/233 |

Primary Examiner—Dave W. Arola
Attorney, Agent, or Firm—Sughrue, Rothwell, Mion, Zinn & Macpeak

[57] ABSTRACT

An equipment unit such as the primary pump of a liquid metal cooled reactor is suspended from the reactor vault roof by means of complementary bearing zones formed respectively in top flanges of the pump and in stationary supporting flanges secured to the vault roof. The flexible connection between the two sets of flanges is provided by a flexible ring, the cross-section of which along a diametral plane comprises a substantially circular convex portion engaged in a concave recess of one bearing zone and a portion having a gear-tooth profile adapted to engage in a corresponding recess of the other bearing zone.

6 Claims, 6 Drawing Figures

FIG.1
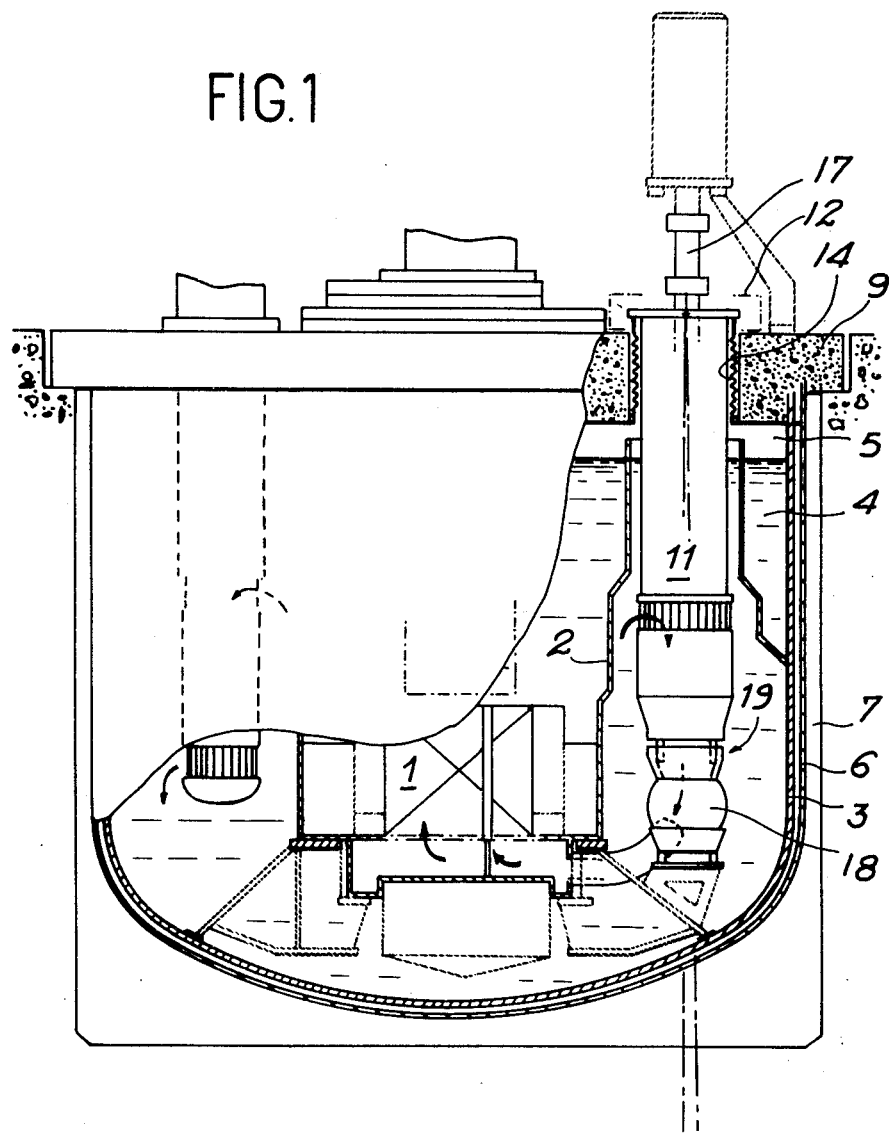
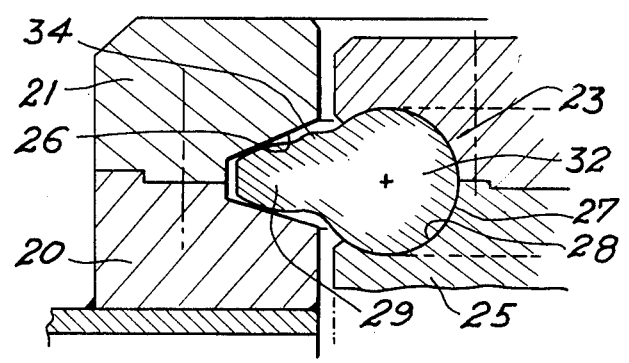
FIG.3b

CONNECTING DEVICE FOR AN EQUIPMENT UNIT SUSPENDED FROM A SYSTEM WHICH SUBJECTS SAID UNIT TO DIFFERENTIAL MOVEMENTS OF DISPLACEMENT

This invention relates to a connecting device for an equipment unit suspended from a system which subjects said unit to differential movements of displacement.

In more exact terms, the invention applies to the case in which the upper end of an equipment unit is intended to be resiliently suspended from a first structure while the lower end thereof is connected to a second structure which is subjected to differential movements of displacement with respect to the first structure. This is the case, for example, with some types of heat exchanger or certain pumps of the vertical axis type which are suspended from a stationary frame, the lower ends of these latter being connected to piping systems in which heat expansions are liable to result in differential displacements of the lower portions with respect to the suspended upper portions of equipment units of this type.

In one particularly advantageous application of the connecting device according to the invention, the equipment unit is suspended within the interior of a sealed enclosure to which access can be gained only through a top opening. In this case, in order to permit the possibility of removal of the equipment unit, the top portion of the unit is suspended from the closure lid of said opening and through this latter and the lower portion of said unit is connected to the movable structure within the enclosure by means of a spherical bearing or swivel-joint coupling system of a type known per se.

The arrangement just mentioned is particularly applicable to the pumps employed for circulating the liquid coolant in nuclear reactors of the liquid metal cooled type.

Pumps of this type are suspended from a roof which closes the top portion of the reactor vault. The vault in turn contains an open-topped metallic vessel having a vertical axis and designed to contain the mass of liquid metal, usually consisting of sodium, which is intended to cool the reactor core. The pumps are connected at their lower ends to a diagrid which is supported on said reactor vessel. Throughout the operation of the reactor, the mass of liquid metal coolant is circulated by the pumps and discharged from these latter to piping systems which feed the lower portions of the fuel elements within the reactor core.

As is the case with most of the components which are immersed in the reactor vessel, the pumps are subjected to appreciable thermal stresses during operating regimes at full power, thus giving rise to differential horizontal and vertical expansions in their structures. In particular, these thermal expansions associated with reactions of the sodium inlet pipes subject the lower portion of the pump to forces which tend to cause this latter to oscillate about its vertical axis. Furthermore, at the time of an operational accident in which the pressure of liquid metal within the reactor vessel is liable to attain very high values, the pump is powerfully urged in the upward direction. In consequence, the pump must be attached to the reactor vault roof in such a manner as to prevent "levitation". Moreover, since the liquid metal which circulates within the reactor vessel and piping systems is highly radioactive, attachment of the pump to the vault roof must ensure complete leak-tightness between said reactor vessel and the exterior.

In designs which are already known, the pump is rigidly fixed to the vault roof and the stresses exerted by the pipes are absorbed by providing sliding-shoe connections of polytetrafluoroethylene, for example. While this solution appears to be simple from a mechanical standpoint, considerable difficulties arise from the point of view of leak-tightness of connections unless these latter are duplicated by bellows seals of large size, thus complicating the manufacture. Moreover, direct observation of the behavior and resistance of such connections is practically impossible by reason of the arrangement adopted for these latter within the reactor vessel.

In other known designs, the pump is suspended by means of a resilient and leak-tight device for enabling it to adopt a pendular movement in order to absorb the stresses arising from differential expansions and from piping reactions. This device is constituted by a resilient annular plate rigidly fixed to the pump and to the supporting roof. This solution is suitable for machines having small dimensions. In the case of large installations, however, the plate must be given prohibitive dimensions in order to endow it with the necessary strength and rigidity in the vertical direction as well as flexibility under bending stress so that the machine is thus capable of carrying out a limited pendular movement. In regard to the connection between the lower end of the pump and the diagrid carried by the reactor vessel, this connection is formed by a sleeve provided at each end with a swivel-joint fitting which serves to absorb the axial and radial displacements of the structures, leak-tightness being ensured by the clamping action resulting from the differential expansion between the swivel-joint fittings and the sleeve.

Although advantageous for reactors of small size, the solution just mentioned cannot readily be contemplated in the case of reactors of large size. This is essentially due to the lack of available space within the reactor vessel in which a certain permissible diameter must be maintained, whereas the sleeve system with two swivel-joint connectors is particularly cumbersome. In reactors of this type, current trends are directed towards more compact pump-connection designs which ensure higher mobility of the pump and minimum space requirements.

This invention is precisely directed to a device providing a connection between a suspended equipment unit and a system which subjects said unit to differential movements of displacement, the result thereby achieved being to overcome the disadvantages attached to the forms of construction mentioned in the foregoing.

The connecting device under consideration, in which the upper end of said equipment unit is resiliently suspended from a first structure while the lower end thereof is connected by means of a swivel-joint system of known type to a second structure which is subjected to differential movements of displacement with respect to said first structure, is distinguished by the fact that said equipment unit is suspended from the first structure by means of associated bearing zones which have complementary shapes and one of which forms part of said unit while the other zone forms part of a stationary frame joined to said first structure, the connection between said frame and said unit being formed by means of a flexible ring having the shape of a torus in which the cross-section along a diametral plane has two continuous portions each in cooperating relation with one of the two bearing zones, namely a first substantially circular convex portion engaged in a concave recess of one of said zones and a second portion having a profile which is adapted to cooperate with the other zone aforesaid.

In one particular embodiment of the invention which is of special interest when the equipment unit is intended to be suspended in a removable manner within a sealed enclosure to which access can be gained only by means of a single top opening, the bottom connection of the equipment unit is provided by a swivel-joint system of known type advantageously constituted by a sleeve for joining said unit to the stationary frame which is rigidly fixed to the second structure, said sleeve being provided at one of the two ends thereof with a ring in the form of a swivel-joint or with a spherical bearing.

In accordance with the same embodiment of the invention, the top connection between the equipment unit and the stationary frame attached to the first structure (usually constituted by the enclosure sealing lid) which are provided in each case with associated bearing zones is formed by means of a flexible ring having the shape of a torus in which the cross-section along a diametral plane has two continuous portions each in cooperating relation with one of the two bearing zones, namely a first substantially circular convex portion engaged in a concave recess of one of said zones and a second portion having a profile which is adapted to cooperate with the other zone aforesaid.

In the applications of the device which are more particularly contemplated, the flexible ring has a cross-section constituted by a circular arc subtending an angle greater than 180° and a curved portion having the profile of a conventional involute gear-tooth and a bulge formed on the bottom portion. The lower circular half-portion is fitted within a concave bearing zone formed in a massive portion which is anchored in the first structure, said massive portion being such as to constitute a continuous supporting ring around the entire periphery of the equipment unit. The upper circular half-portion is fitted in a member which is screwed onto the supporting ring and constitutes the anti-levitation flange.

In this application, the top flange of the equipment unit bears on the top portion of the ring which has the profile of a conventional involute gear-tooth, said portion being engaged within a bearing zone in the form of a V-shaped channel formed by said top flange and by the pump counterflange which is clamped against said top flange by screwing.

In accordance with another embodiment of the invention, the flexible ring has a cross-section constituted by a circular arc subtending an angle which is greater than 180° and a curved portion having a concave profile corresponding to the profile of a conventional involute gear-tooth. The circular portion is engaged in a bearing zone formed in the top flange of the equipment unit and the counter-flange, the concave portion of the ring being applied against a projecting portion of an associated member screwed to a member which is anchored in the closure lid.

On the one hand in regard to the top connection of the equipment unit, the device has a less rigid suspension so that the permissible oscillations of said equipment unit can be of greater amplitude. On the other hand in regard to the bottom connection of the equipment unit with the bottom structure, said device has the effect of reducing the substantial overall size of a system provided with two spherical bearings, leakages at the level of said spherical bearings and excessive angular displacements at the level of said connection.

As can readily be understood, it is also possible to have the following alternative form of construction: the flexible ring has a circular portion and a hollow portion, the circular portion being engaged in the supporting ring, the flange of the equipment unit being provided with a projecting portion having the profile of a conventional involute gear-tooth which is applied against said flexible ring.

Finally, in all the embodiments described in the foregoing, the supporting members and especially the supporting ring can be constituted by a plurality of separate sectors anchored in the reactor vault roof and arranged in a non-continuous manner around the entire periphery of the pump.

Further characteristic features of the device will become apparent from the following description of embodiments which are given solely by way of example without any limitation being implied, reference being made to the accompanying figures, wherein:

FIG. 1 is a partial axial sectional view of a nuclear reactor of the liquid metal cooled type, showing the general positional arrangement of a primary pump suspended by means of a connecting system in accordance with the invention;

FIG. 3b is an alternative embodiment of the device shown in FIG. 3a;

Figure 2:
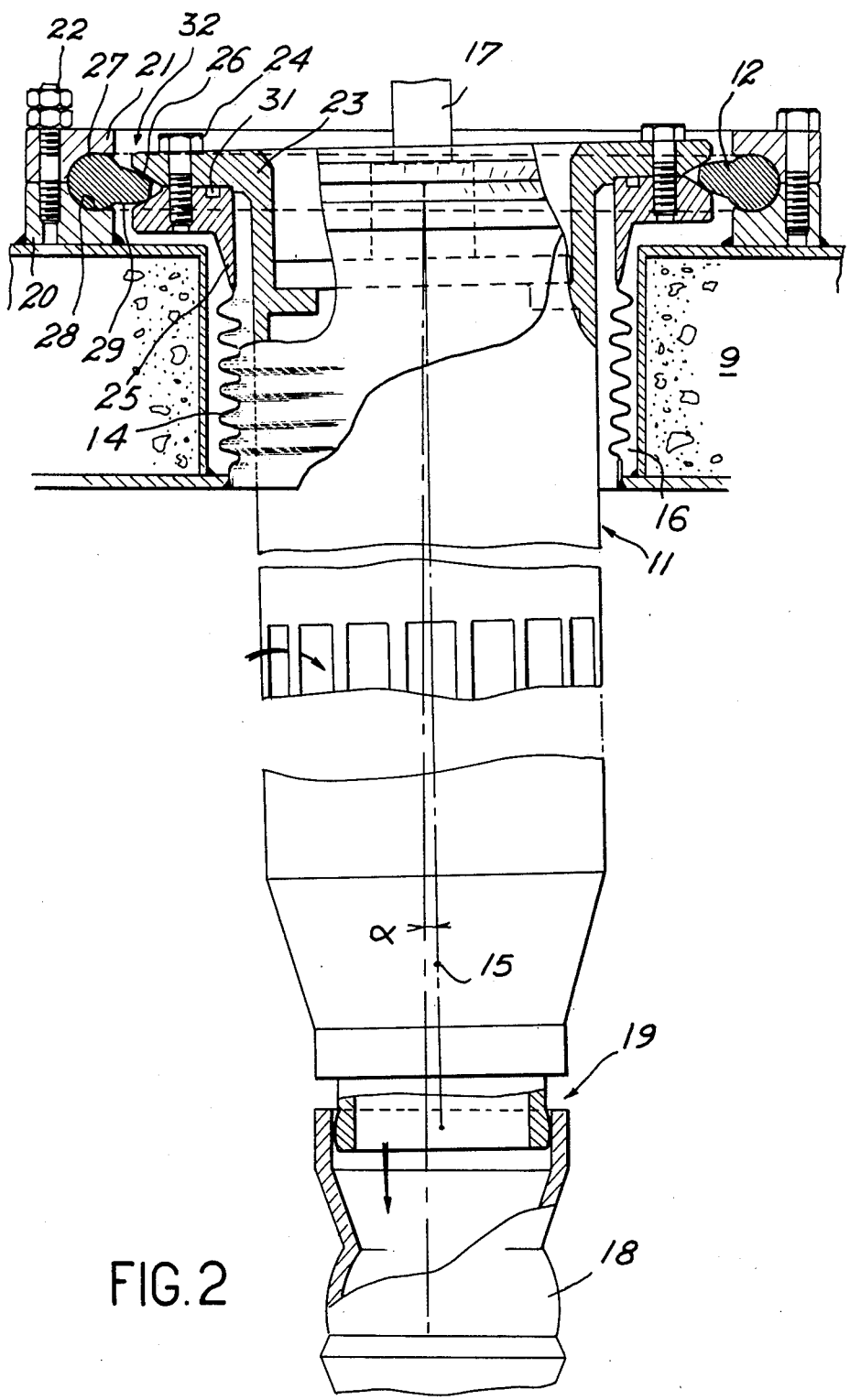
FIG. 2 is an axial sectional view of the primary pump of a nuclear reactor of the liquid metal cooled type, showing an alternative form of the device for providing a flexible coupling with the closure slab or reactor vault roof.

As shown in FIG. 1, the fast reactor core as designated by the reference 1 is immersed in a mass of liquid metal and especially sodium which serves to cool the reactor. The core 1 is mounted within an inner vessel 2 surrounded by an open-topped primary vessel 3 which contains the liquid sodium to a level shown diagrammatically at 4. An atmosphere 5 of inert blanket gas usually consisting of argon is present above said liquid sodium. The primary vessel 3 is in turn surrounded by a safety vessel or so-called leak-jacket 6; the two vessels have a common vertical axis and are both placed within an outer containment vault 7 having a wide top opening 8 in which is mounted a roof 9. Said roof is traversed in leak-tight manner by a number of components and in particular by the primary pumps, one of which is designated by the reference 11 and coupled by means of a shaft 17 to a motor 10. Said pump is suspended from the reactor vault roof 9 by means of a swivel-joint coupling system 12 provided with bellows seals 14. The lower end of the pump is connected to a stationary frame 18 by means of a second swivel-joint coupling system in accordance with the invention, said frame 18 being rigidly fixed to the primary vessel 3.

FIG. 2 shows a primary pump 11 having a vertical axis 15 and suspended within an opening 16 formed in the roof 9 which closes the reactor vessel. Said pump 11 is driven by an electric motor (not shown in the drawings) by means of a shaft 17 which emerges from said pump 11. The lower end of the pump 11 is attached by means of a swivel-joint coupling system 19 to a stationary structure or diagrid 18 which is rigidly fixed to the primary vessel 3. The upper end of said pump is suspended by means of the swivel-joint coupling system 12.

The swivel-joint coupling system aforesaid comprises a stationary portion which is rigidly fixed to the vault roof 9 and constituted by an annular flange 20 or supporting ring which is secured to said roof 9 by means of anchoring bolts (not shown in the drawings), also by an anti-levitation flange 21 placed above the annular flange 20 and having the same external and internal diameters as this latter. Said annular flange is clamped in position by means of bolts 22 which pass through said anti-levitation flange and engage within internally threaded bores formed in the supporting ring 20. The movable portion of the connecting device which is rigidly fixed to the pump 11 is constituted by a top flange 23 of the pump 11 beneath which is fixed, by means of bolts 24, an annular counter-flange 25 which has the same external diameter as the pump flange 23 and surrounds the zone of junction of said flange 23 with the body of the pump 11. Moreover, that face of said counter-flange 25 which is in contact with the pump flange 23 is fitted with an O-ring seal 31.

Figure 3A:
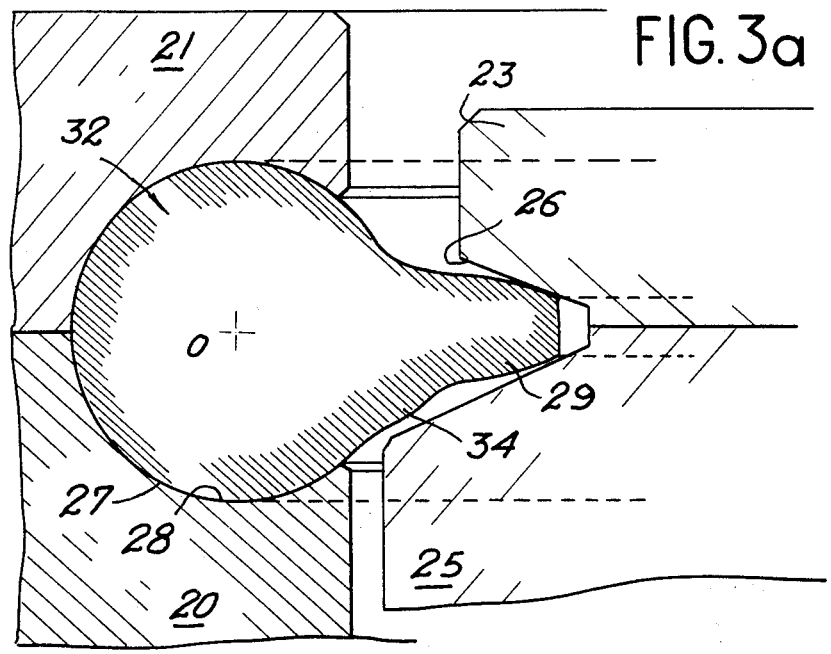
FIG. 3a is an axial sectional view to a larger scale and showing the flexible ring of the top connection device of the pump shown in FIG. 2.

The connecting member between the stationary portion and the movable portion of the device 12 is a flexible ring 32 (as shown in FIG. 3a) formed in a single piece and having in accordance with the invention a flat diametrical cross-section constituted by a circular portion 28, the arc of which subtends an angle of more than 180°. Said circular portion has the same diameter as the channel 27 formed in the supporting ring 20 and in the anti-levitation flange 21 in which said portion 28 is engaged. The flexible ring aforesaid also has a portion of cross-section 29 in the shape of a gear-tooth having a conventional involute profile which is engaged within the channel 26 and the bottom portion of which has a bulge 34.

In accordance with the invention, the assembly formed on the one hand by the flanges 20 and 21 and on the other hand by the flanges 23 and 25 constitutes the two associated bearing zones of complementary shape which serve to join the components together by means of the flexible ring 32. It is readily apparent that the converse symmetrical arrangement can be employed just as easily without departing from the scope of the invention; this is the case illustrated in FIG. 3b in which the corresponding elements are designated by the same reference numerals but in which the circular portion 28 of the flexible ring 32 is held in fixed relationship with the flanges 23 and 25 connected to the pump and in which the portion 29 having the shape of a conventional involute gear-tooth is carried by the supporting ring 20. However, in this embodiment, the bulge 34 is formed on the top edge of the tooth 29 since said top edge will come into contact with the flange 21 in the event of levitation of the pump.

Finally, a cylindrical bellows seal 14 (shown in FIG. 2) which surrounds the pump 11 over at least part of the entire thickness of the vault roof 9 and forms a separation between this latter and the pump is welded to the bottom portion of said roof 9 and to the counter-flange 25 of the pump 11.

A V-section channel 26 is formed at the periphery of the pump flange 23 and of the pump counter-flange 25 whilst a circular channel which subtends an angle of more than 180° is such that one-half of said circular channel is formed in the supporting-ring flange 20 and the other half is formed in the anti-levitation flange 21.

In the example which is more especially described and illustrated in FIG. 2, the material which constitutes the flexible ring 32 and which is usually made of a highly elastic metal is of spring steel. The mean diameter of said ring 32 is 2930 mm and the diameter of its circular cross-section is 80 mm. The radius of action of the portion 29 with respect to the center 0 of the circular cross-section 30 is approximately 70 mm.

In all cases, the pump 11 is supported on the vault roof 9 by its top flange 23 which is applied against the projecting portion 29 of the flexible ring 32. The weight of the pump 11 is uniformly distributed over an entire annulus of the flexible ring 32, thus producing a slight rotational movement of this latter. In a particular example, the weight of the pump is 140 metric tons, with the result that the angle of rotation of the flexible ring is 52'.

In addition, if the conditions of thermal expansion are such that a thrust is exerted on the lower end of the pump 11 in a direction which is not parallel to its vertical axis 15, the effect of thrust will be such as to cause the entire pump 11 to move away from its position of equilibrium and thus to make a certain angle α with the vertical axis 15. This angular displacement α is represented at the level of the device 12 as follows: a certain arc of tooth of the flexible ring 32 rises whilst the diametrically opposite arc falls, thereby subjecting said flexible ring to a torsional couple. The profiles of contact between the gear-tooth shaped annular portion 29 and the V-shaped channel 26 remain tangent to each other irrespective of the intensity of thrust exerted on the pump 11. The flexible ring sets up in opposition to said torsional couple a restoring couple which results in movements of oscillation of the pump 11. It is also worthy of note that the bottom connection of the pump 11 formed by the swivel-joints system 19 absorbs part of the vertical and horizontal displacements produced by the external thrust, thus appreciably reducing the angle of displacement α and consequently the torsional couple to which the flexible ring 32 of the top connection device 12 is subjected. In this example to which more particular consideration is given and in the case of a lateral thrust of the order of 425 daN, namely approximately 0.425 metric ton at the bottom level of the pump 11, resulting in a horizontal displacement of approximately 50 mm at said bottom level, the maximum angle of rotation of the flexible ring is 40'55" and the restoring couple exerted by the ring is approximately 50,000 Newton-meter.

In the case of reactor operation under accident conditions in which the pressure of the liquid metal attains very high values, in particular within the lower piping systems which supply the pump 11, said pump is powerfully urged upwards in spite of its weight and this results in a vertical displacement of the entire pump assembly. This displacement is partly absorbed by the swivel-joint coupling system 19 which connects the pump 11 to the diagrid 18. At the level of the top connection, the upward thrust produces a movement of rotation of the flexible ring 32 about its center 0 and the counter-flange 25 comes directly into contact with the bulge 34 formed on the portion 29 of the flexible ring. Said point of contact is brought nearer to the center 0 of the flexible ring 32 by means of the bulge 34. This produces a considerable reduction in the leverage effect of the upward thrust and consequently in the moment which is uniformly applied around the entire periphery of the flexible ring 32. In addition, the anti-levitation flange 21 produces a marked improvement in the attachment of the pump 11 to the vault roof 9, this being particularly appreciable in the event of "levitational thrust" resulting from an upwardly directed impulse and caused by a pressure wave generated within the reactor vessel. In the particular example which is contemplated, the weight of the pump is 140 metric tons, the levitational thrust load to which the pump may be subjected is 475 tons, namely more than three times its own weight, and said thrust load results in an angle of rotation of the flexible ring 32 about its center 0 of approximately 5° 40'.

Figure 4A:
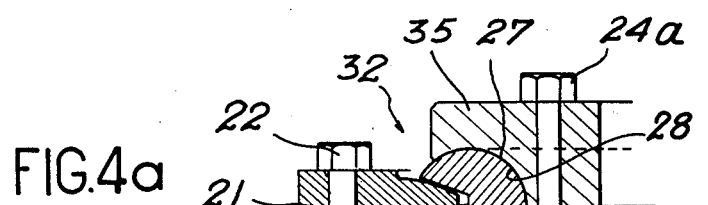
FIGS. 4a and 4b are particular embodiments of the top pump suspension.

In FIG. 4a, the flexible ring 32 is provided with a circular portion 28 which subtends an angle of more than 180°, said circular portion being fitted within a channel 27 having the same profile and formed in the pump flange 23 and in a member 35 which is placed above said flange. Said flexible ring 32 is also provided with a hollow V-shaped portion 36 in which is intended to be engaged a member 21 having a portion 21a which has a corresponding profile. Said member 21 is carried on the reactor roof 9 by a supporting ring 20, the two members 20 and 21 being joined together by means of a bolt 22. Furthermore, a counter-flange 25a fitted with a seal 31 is placed beneath the pump flange 23, a fastening bolt 24a being passed through all these members 35, 23, 25a.

Figure 4B:
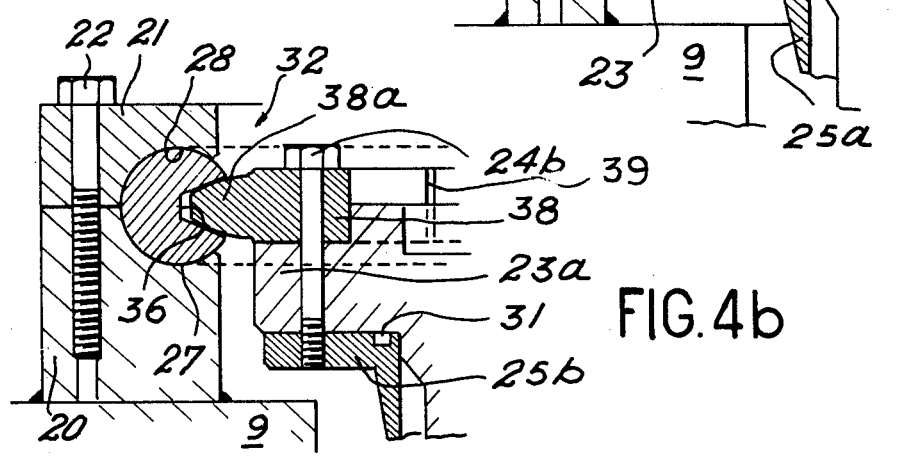

In FIG. 4b, the circular portion 28 of the flexible ring 32 is housed within a cavity 27 having the same profile, said cavity being formed in the supporting ring 20 and in the anti-levitation flange 21 which is mounted above said supporting ring. Said flexible ring 32 is provided with a concave V-shaped portion 36 in which is intended to be engaged a member 38 having a portion 38a which has a profile corresponding to the profile of a conventional involute gear-tooth; said portion 38 is secured to the pump flange 23a, the bottom portion of which is clamped against a counterflange 25b in leak-tight manner, a fastening bolt 24b being passed through the assembly formed by the three components just mentioned. In the case of FIGS. 4a and 4b, it is apparent that the spherical portion 28 of the flexible ring 32 in conjunction with the portions 21a and 38a having the shape of gear teeth constitute the associated bearing zones of complementary shape which provide a connection between the pump 11 and the reactor vault roof 9 by means of the flexible ring 32.

Finally, it is possible within the scope of the invention to contemplate the use of a number of sectors arranged separately around the pump instead of a single supporting ring; in this case, each sector supports a portion of the flexible ring. The gap 39 between two adjacent sectors is shown in FIG. 4b.

What we claim is:

1. In a connecting device of the type in which the upper end of an equipment unit is resiliently suspended from a first structure by resilient suspension means while the lower end thereof is connected by means of a swivel joint to a second structure which is subjected to differential movements of displacement with respect to said first structure, said resilient suspension means comprising first and second opposed annular bearing surfaces on the upper end of said equipment unit and said first structure, a torus shape resilient metal ring having first and second annular bearing portions disposed in engagement with said first and second bearing surfaces, respectively, said first bearing surface and said first bearing portion having complimentary partial circular cross-sections whereby said first bearing portion is rotatable relative to said first bearing surface about a circular axis.

2. In a connecting device as set forth in claim 1, wherein one of said second bearing surface and said second bearing portion is comprised of a concave V-shaped groove and the other of said second bearing surface and said second bearing portion is comprised of projection means having an involute gear-tooth profile in engagement with said groove.

3. In a connecting device as set forth in claim 2, wherein said projection means is integral with said ring.

4. In a connecting device as set forth in claim 2, wherein said groove is formed in said torus shaped ring and said projections means is mounted on one of said equipment unit and said first structure.

5. In a connecting device as set forth in claim 4, wherein said projection means is comprised of a plurality of individual sectors.

6. In a connecting device as set forth in claim 2, wherein a bulge is located on one side of said projection means adjacent the base thereof for engagement with one of said first and second bearing surfaces to limit relative movement between said first structure and said equipment unit.

* * * * *